United States Patent [19]
Yanagisawa et al.

[11] Patent Number: 5,734,238
[45] Date of Patent: Mar. 31, 1998

[54] CONTROL SYSTEM IN ELECTRIC VEHICLE

[75] Inventors: Shigeru Yanagisawa; Hisahiro Ito; Masafumi Usuda; Iwao Shimane, all of Saitama, Japan

[73] Assignee: Honda Giken Kogyo Kabushiki Kaisha, Tokyo, Japan

[21] Appl. No.: 726,683

[22] Filed: Oct. 7, 1996

Related U.S. Application Data

[63] Continuation of Ser. No. 399,978, Mar. 6, 1995, abandoned.

[30] Foreign Application Priority Data

Mar. 4, 1994 [JP] Japan .................. 6-034722

[51] Int. Cl.$^6$ .................. G05B 19/04
[52] U.S. Cl. ............. 318/139; 180/65.1; 364/423.098
[58] Field of Search .................. 318/139–147, 318/151–158; 364/423.098, 423.099, 424.12–426.46; 120/178, 179, 60, 65.1

[56] References Cited

U.S. PATENT DOCUMENTS

| | | | |
|---|---|---|---|
| 3,621,929 | 11/1971 | Oberthur et al. | 180/65.1 |
| 4,807,516 | 2/1989 | Takats | 318/564 X |
| 4,809,803 | 3/1989 | Ahern et al. | 180/65.1 |
| 4,841,209 | 6/1989 | Poumakis | 318/564 |
| 4,887,214 | 12/1989 | Takats et al. | 318/564 X |
| 4,928,227 | 5/1990 | Burba et al. | 318/12 |
| 5,019,759 | 5/1991 | Takemura et al. | 318/466 |
| 5,161,634 | 11/1992 | Ichihara et al. | 180/179 |
| 5,166,584 | 11/1992 | Fukimo et al. | 318/139 |
| 5,340,202 | 8/1994 | Day | 318/373 X |
| 5,343,974 | 9/1994 | Rabek | 180/65.1 X |
| 5,403,244 | 4/1995 | Tankersley et al. | 180/65.1 X |
| 5,487,002 | 1/1996 | Diller et al. | 364/424.01 |
| 5,614,809 | 3/1997 | Kiuchi et al. | 318/139 X |
| 5,627,438 | 5/1997 | Barrett | 318/139 |
| 5,632,534 | 5/1997 | Knechtges | 180/65.1 X |

FOREIGN PATENT DOCUMENTS

06-377302  4/1988  Japan .

*Primary Examiner*—Brian Sircus
*Attorney, Agent, or Firm*—Lyon & Lyon LLP

[57] ABSTRACT

A control system in an electric vehicle includes a power driver control device for controlling a driving system including the electric motor, a management control device for controlling a power distributing system including the battery, a brake control device for controlling a braking system including the brake device. These control devices are disposed in a distributed arrangement in the vehicle body. A power train collective-control device administers the controlling of a transmission system; collectively controls and monitors the power driver control device, the management control device, and the brake control device, and also backs up any of these control devices which is out of order, i.e., has developed trouble. Thus, it is possible to provide improvements in processing speed and reliability of the control system in the electric vehicle.

13 Claims, 8 Drawing Sheets

CONTROL SYSTEM IN ELECTRIC VEHICLE

This application is a Continuation Application of application Ser. No. 08/399,978 filed on Mar. 6, 1995 now abandoned.

BACKGROUND OF THE INVENTION

1. Field of the Invention

The present invention relates to a control system for controlling a driving system, a power distributing system and a braking system in an electric vehicle.

2. Description of the Prior Art

An electric vehicle using an electric motor connected to a battery as a traveling drive source requires the controlling of the braking system, as does a vehicle using an internal combustion engine as a drive source, in addition to the controlling of the driving system, including the motor, and the controlling of the power distributing system, including the battery. The controlling of the systems is carried out by an electronic control system having a CPU. In the prior art electric vehicle, such various controls have been administered by a common electronic control system (for example, see Japanese Patent Application Laid-open No. 77302/88).

If all the controlling of the driving system, the power distributing system and the braking system are intended to be provided by the common control system, the capacity of the CPU and the capacity of a memory are insufficient, resulting in a reduced processing speed, but also when trouble is produced in any of the systems, it is difficult to back up the system having the trouble.

SUMMARY OF THE INVENTION

Accordingly, it is an object of the present invention to provide a control system in an electric vehicle, which has a higher processing speed and an excellent reliability.

To achieve the above object, according to a first aspect and feature of the present invention, there is provided a control system in an electric vehicle including a battery, a motor driven by the battery to travel the vehicle, and a brake device for braking the vehicle, the control system comprising: a power driver control device for controlling a driving system including the motor; a management control device for controlling a power distributing system including the battery; and a brake control device for controlling a braking system including the brake device, with the power driver control device, the management control device and the brake control device being disposed in a distributed manner and collectively controlled and monitored by a power train collective-control device.

With the above arrangement, it is possible to control the driving system, the power distributing system and the braking system by the independent control devices, thereby providing an enhanced processing speed, as compared with a case where all the controllings are effected by the common control system, and moreover, the control system can be laid out by effectively utilizing space in the vehicle. In addition, a high-pressure control system and a low-pressure control system can be disposed in a separated manner, thereby preventing a switching noise in the high-pressure control system from exerting an influence on the low-pressure system.

In addition to the first feature, according to a second aspect and feature of the present invention, the power driver control device, the management control device and the brake control device are mutually monitored for detecting a trouble in any of the three control devices through communication with the power train collective-control device.

With the above second feature, even if any of the control devices is out of order, i.e., develops trouble, the control device having the trouble can be backed up by the power train collective-control device, leading to an increased reliability.

The above objects, features and advantages of the invention will become apparent from the following description of preferred embodiments in conjunction with the accompanying drawings.

DESCRIPTION OF THE PREFERRED EMBODIMENTS

The present invention will now be described by way of preferred embodiments in connection with the accompanying drawings.

Figure 1:
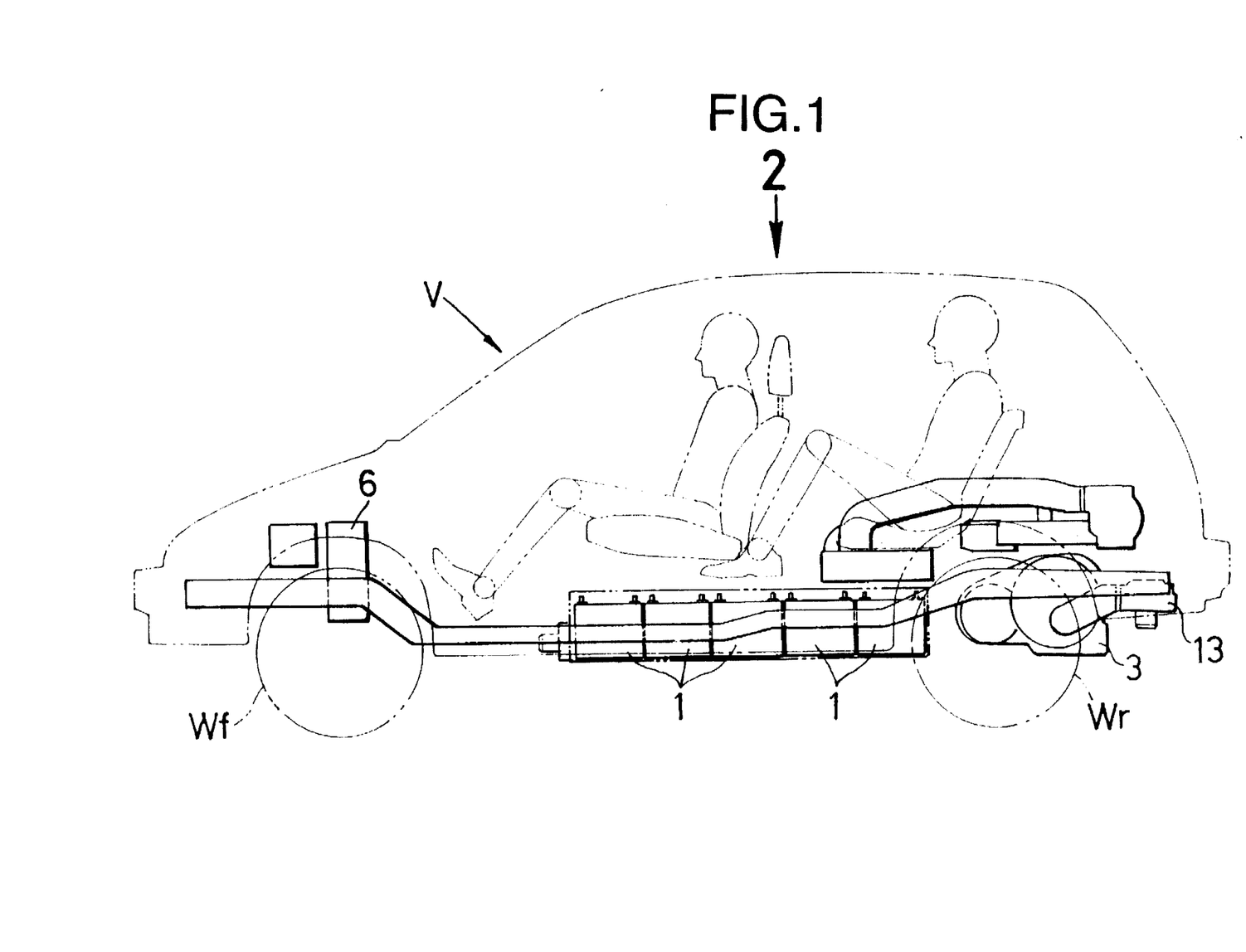
FIG. 1 is a side view of the entire electric vehicle to which a first embodiment of the present invention is applied.
Figure 2:
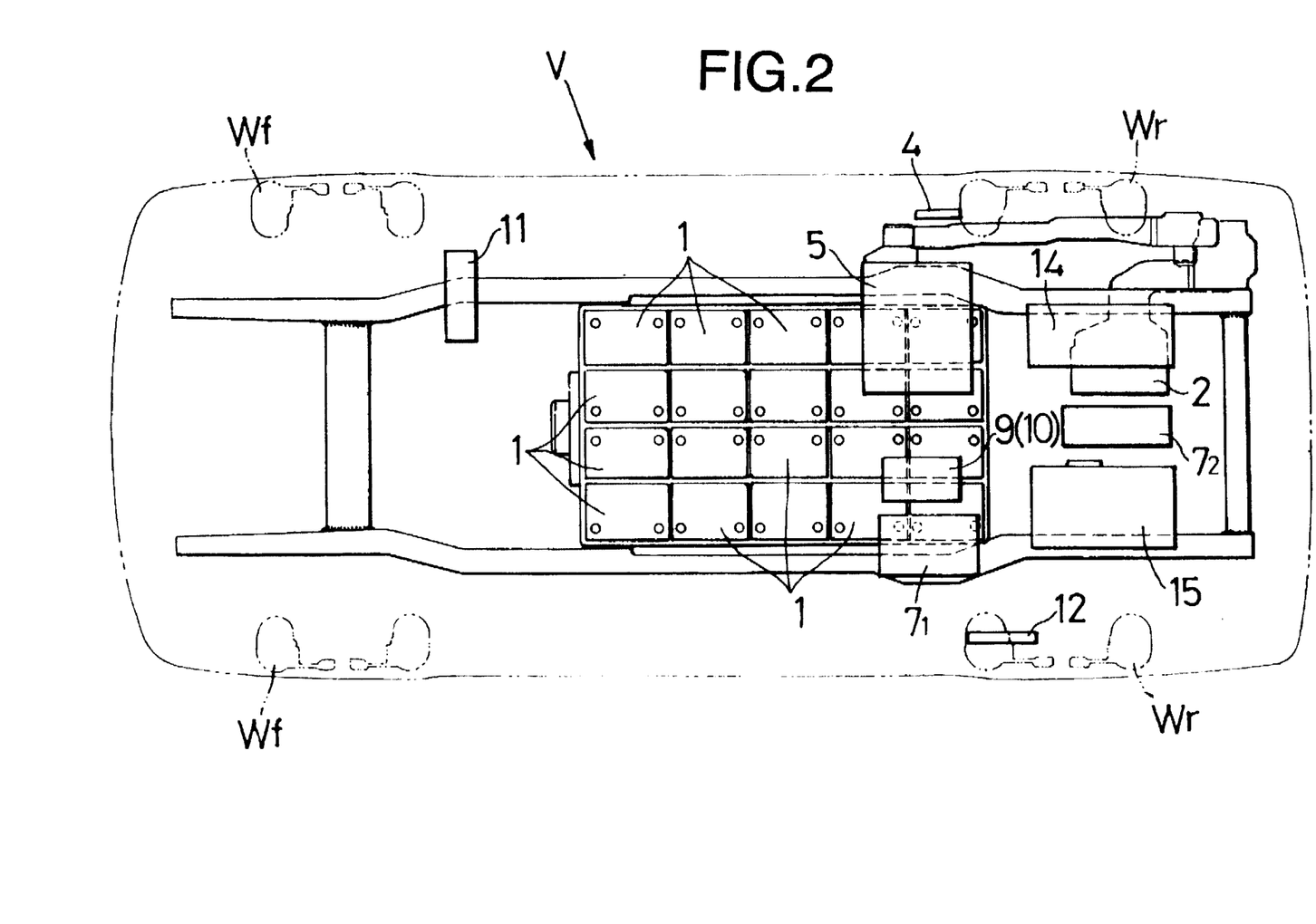
FIG. 2 is a top view taken in the direction of arrow 2 in FIG. 1.

Referring to FIGS. 1 and 2, a four-wheel electric vehicle having front wheels Wf and rear wheels Wr includes a main battery 1 of 240 V to 280 V mounted on a central lower surface of a vehicle body and is adapted to travel by driving the rear wheels Wr through a transmission 3 by a motor 2 connected to the main battery 1. A power driver control device 4 including a PWM inverter is mounted on a right side of the vehicle body, and the driving of the motor 2 is controlled by the power driver control device 4 through a power driver unit 5.

A management control device 10 is accommodated in a breaker box 9 mounted at a central portion of the vehicle body. Connected to and controlled by the management control device 10 are: a charger 6 for charging the main battery 1 by an external commercial power supply; a downverter $7_1$ of 48 V for reducing the voltage of the main battery 1 to 48 V to charge a subsidiary battery 19 (see FIG. 4); a downverter $7_2$ of 12 V for reducing the voltage of the main battery 1 to 12 V to charge the subsidiary battery 19; and a main breaker 8 (see FIG. 4) for cutting-off the current from the main battery 1.

A brake control device 11 is mounted at a front portion of the vehicle body. The hydraulic braking of the front and rear wheels Wf and Wr and the regenerative braking of the rear wheels Wr connected to the motor 2 are controlled by the brake control device 11.

Figure 3:
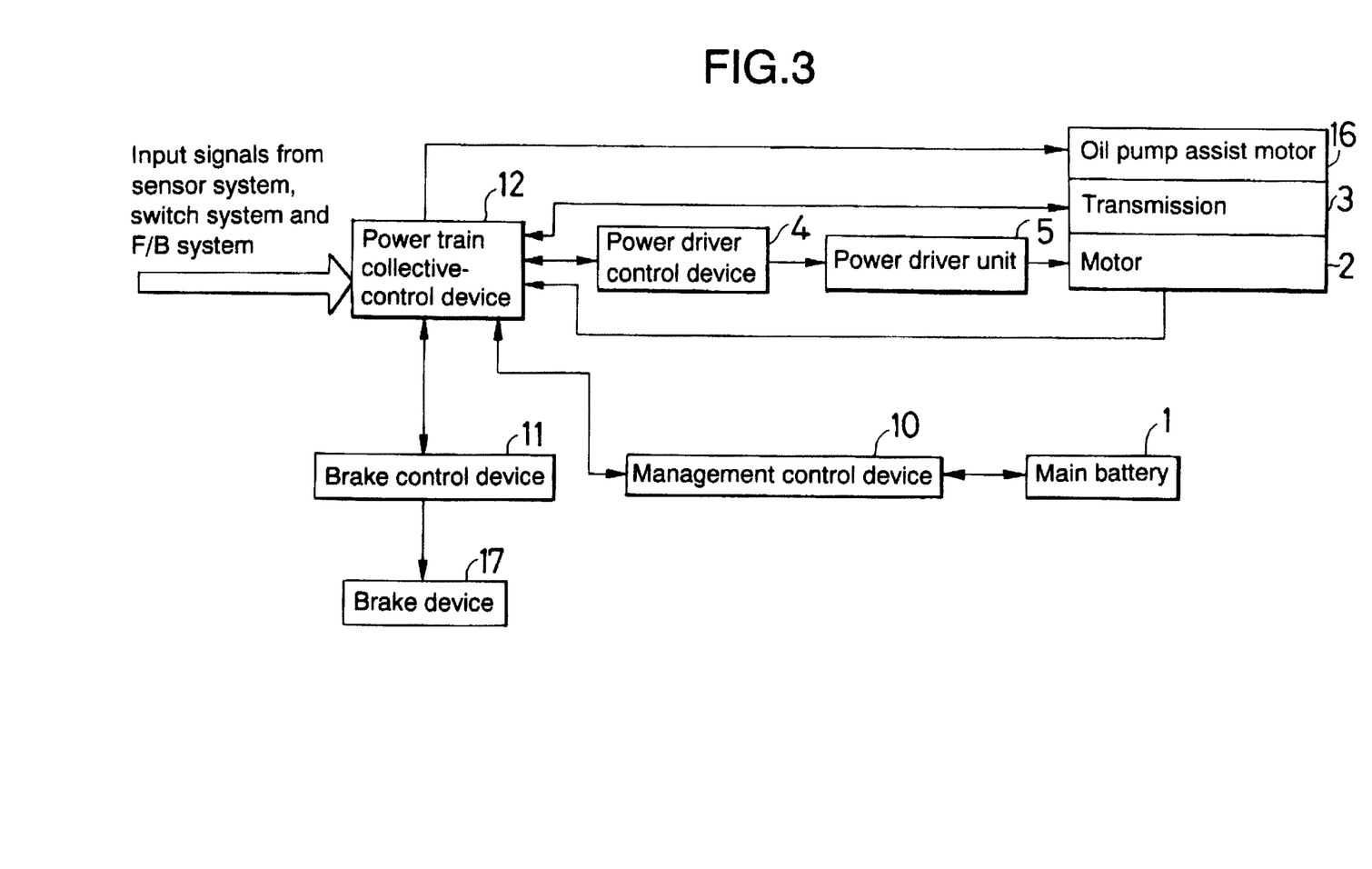
FIG. 3 is a basic system diagram of a control system.

A power train collective-control device 12 is mounted on a left side of the vehicle body. As shown in a basic system diagram in FIG. 3, the power train collective-control device 12 is connected to the power driver control device 4, the management control device 10 and the brake control device 11 to collectively control and monitor them.

In the Figures, reference character 13 identifies a motor cooling fan; reference character 14 identifies an inverter for an air conditioner; and reference character 15 identifies a junction box.

Figure 4:
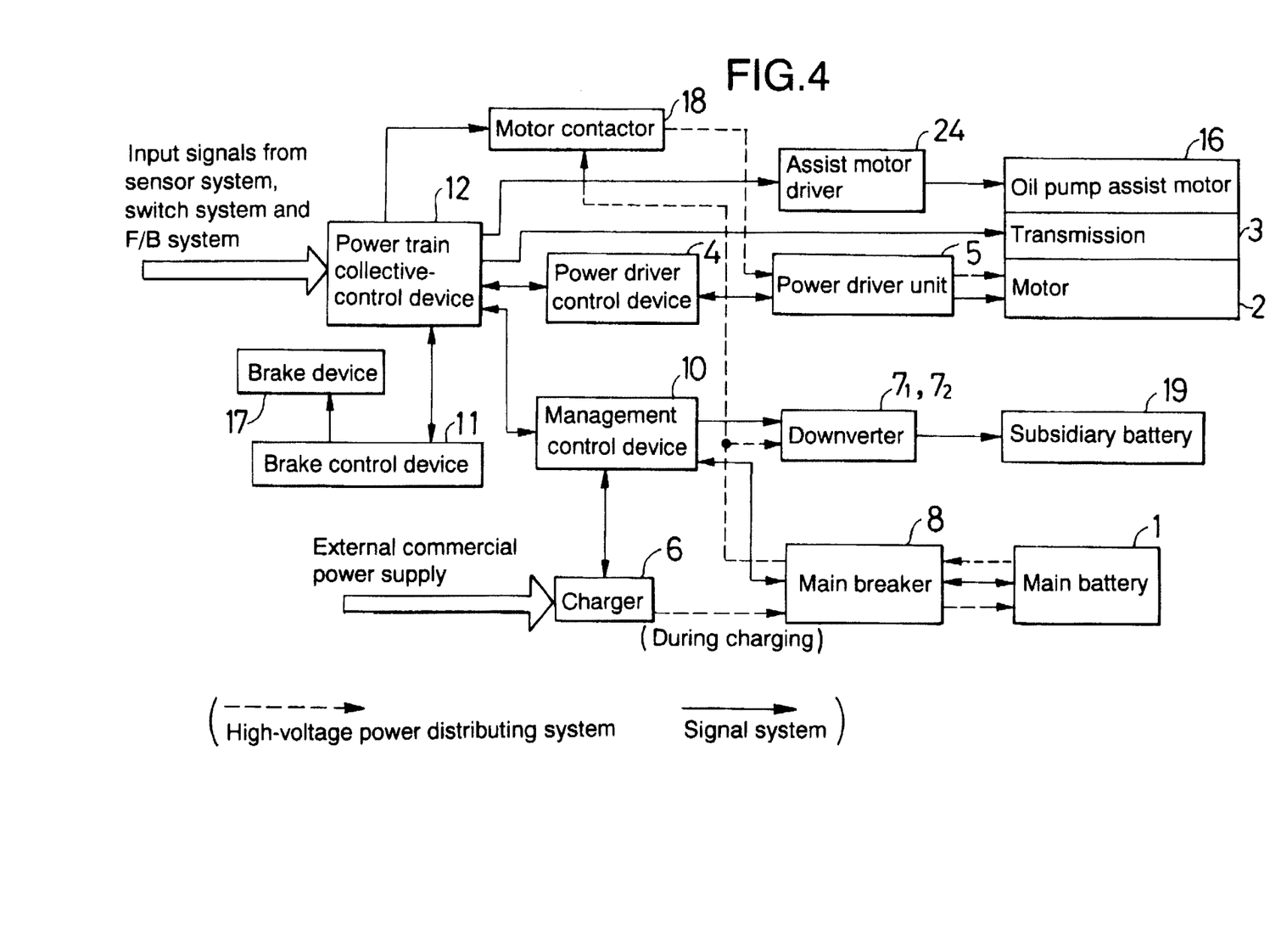
FIG. 4 is a system diagram of the control system.
Figure 5:
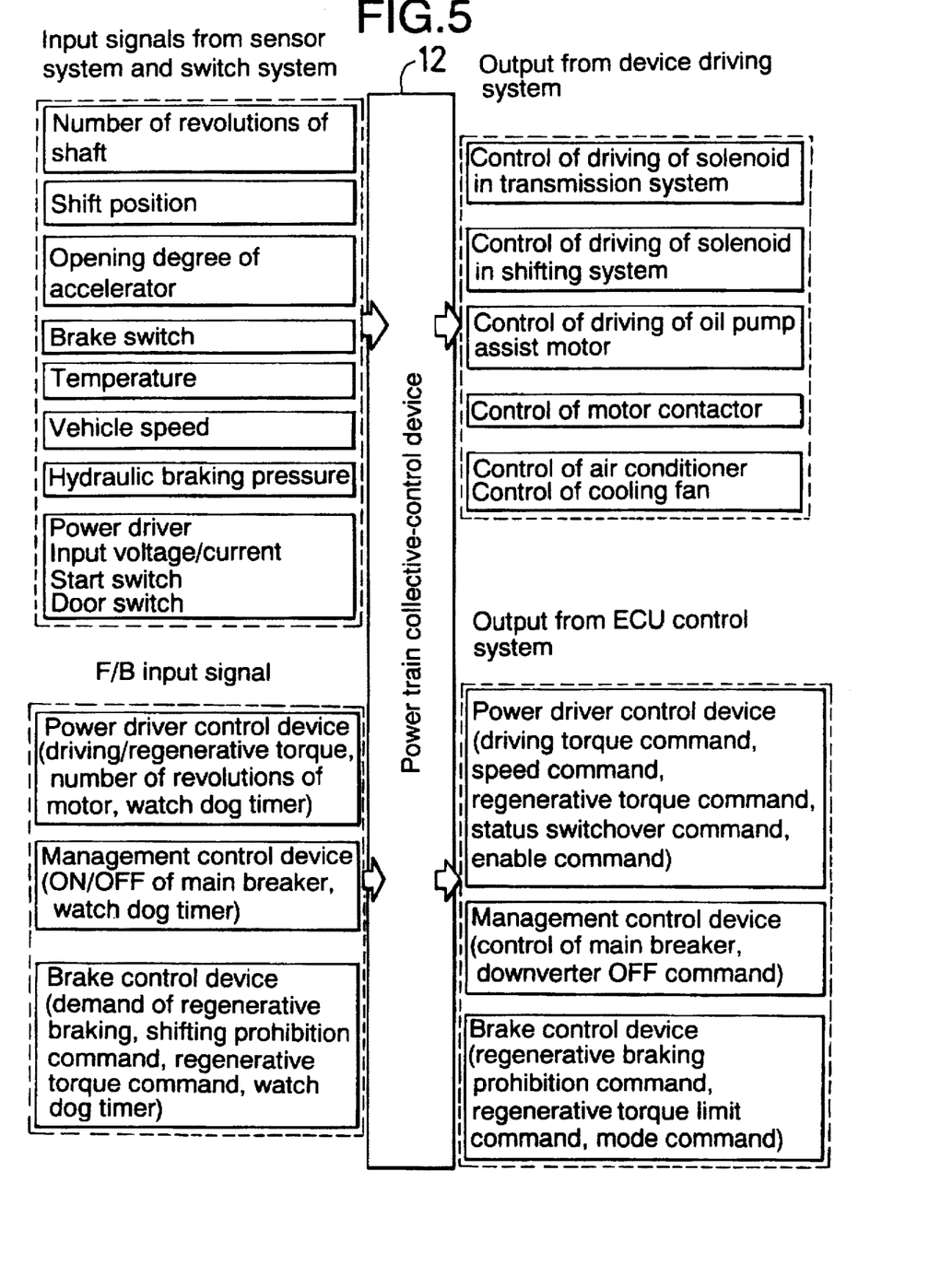
FIG. 5 is a diagram for explaining the function of a power train collective-control device.

As shown in FIGS. 4 and 5, the power train collective-control device 12 includes a single CPU and governs the processing of signals received from various sensors and switches, the processing of feed-back signals from the power driver control device 4, the management control device 10 and the brake control device 11, the collective controlling and monitoring of the power driver control device 4, the management control device 10 and the brake control device 11, and commands to the transmission 3 and auxiliary devices.

The signals supplied from the various sensors and switches to the power train collective-control device 12 include a signal indicative of the number of revolutions of a main shaft and a counter shaft, a signal indicative of the shift position of the transmission 3, a signal indicative of the accelerator opening degree, a signal indicative of ON/OFF of each of a foot brake switch and a parking brake switch, a signal indicative of the temperature of the motor 2, a power element, the main battery 1, the transmission oil and the like, a signal indicative of a vehicle speed, a signal indicative of a hydraulic braking pressure, signals indicative of input voltage and current into the power driver unit 5, a signal indicative of ON/OFF of a start switch, and a signal indicative of ON/OFF of a door switch.

Signals for driving a device driving system by the power train collective-control device 12 include a signal indicative of a command to drive a solenoid in a transmission system, a signal indicative of a command to drive a solenoid in a shift system, a signal indicative of a command to drive an oil pump assist motor 16, a signal indicative of a command to drive a motor contactor 18, a signal indicative of a command to drive the inverter 14 for the air conditioner, and a signal indicative of a command to drive the motor cooling fan 13.

The power driver control device 4 connected to the power train collective-control device 12 controls the torque of the motor 2 by the PWM inverter and also controls the power driver unit 5 using the power element. A driving torque command signal, a speed command signal, a regenerative torque command signal, a status switchover command signal and an enable command signal are supplied from the power train collective-control device 12 to the power driver control device 4. Signals indicative of driving and regenerative torque of the motor 2, a signal indicative of the number of revolutions of the motor 2 and a watch dog timer signal are supplied from the power driver control device 4 to the power train collective-control device 12.

The management control device 10 connected to the power train collective-control device 12 administers the monitoring of the state (the voltage, current and temperature) of the main battery 1, the controlling of the high-voltage power distribution, the detection of grounding, the controlling of the main breaker 8, the controlling of the motor contactor 18 for turning the motor 2 ON or OFF, the controlling of the charger 6 and the controlling of the downverters $7_1$ and $7_2$. A signal indicative of a command to control the main breaker 8 and a signal indicative of a command to turn the downverters $7_1$ and $7_2$ OFF are delivered from the power train collective-control device 12 to the management control device 10. A signal indicative of a command to turn the main breaker 8 ON or OFF and the watch dog timer signal are delivered from the management control device 10 to the power train collective-control device 12.

The brake control device 11 connected to the power train collective-control device 12 administers the controlling of a brake device 17 including a hydraulic brake, an antilock brake and a regenerative brake. A regenerative brake prohibition command signal, a regenerative torque limit command signal and a mode command signal are delivered from the power train collective-control device 12 to the brake control device 11, and a regenerative brake demand signal, a shift prohibition command signal, a regenerative torque command signal and the watch dog timer signal are delivered from the brake control device 11 to the power train collective-control device 12.

The power driver control device 4, the management control device 10 and the brake control device 11 each deliver the watch dog timer signal for detection of trouble to the power train collective-control device 12. The power train collective-control device 12 always monitors the watch dog timer signal, and when trouble in the power driver control device 4, the management control device 10 or the brake control device 11 is detected by an abnormality of the watch dog timer signal, the power train collective-control device 12 backs up the control device having such trouble.

The power driver control device 4, the management control device 10, the brake control device 11 and the power train collective-control device 12, each of which includes the CPU, are disposed in a distributed arrangement in the vehicle, so that the driving system is controlled by the power driver control device 4; the power distributing system is controlled by the management control device 10, and the braking system is controlled by the brake control device 11. Therefore, it is possible to provide an enhancement in processing speed, as compared with a case where all the controls are effected by a common control device. In addition, the distributed arrangement of the control devices ensures that a high-pressure control system and a low-pressure control system can be separated from each other to prevent a switching noise in the high-pressure control system from influencing the low-pressure system, and moreover, the space within the vehicle can be effectively utilized. Further, an increased reliability can be provided by monitoring the trouble in the power driver control device 4, the management control device 10 and, the brake control device 11 by the power train collective-control device 12 through the watch dog timer signal, and by backing-up the control device having the trouble by the power train collective-control device 12, when trouble occurs.

Figure 6:
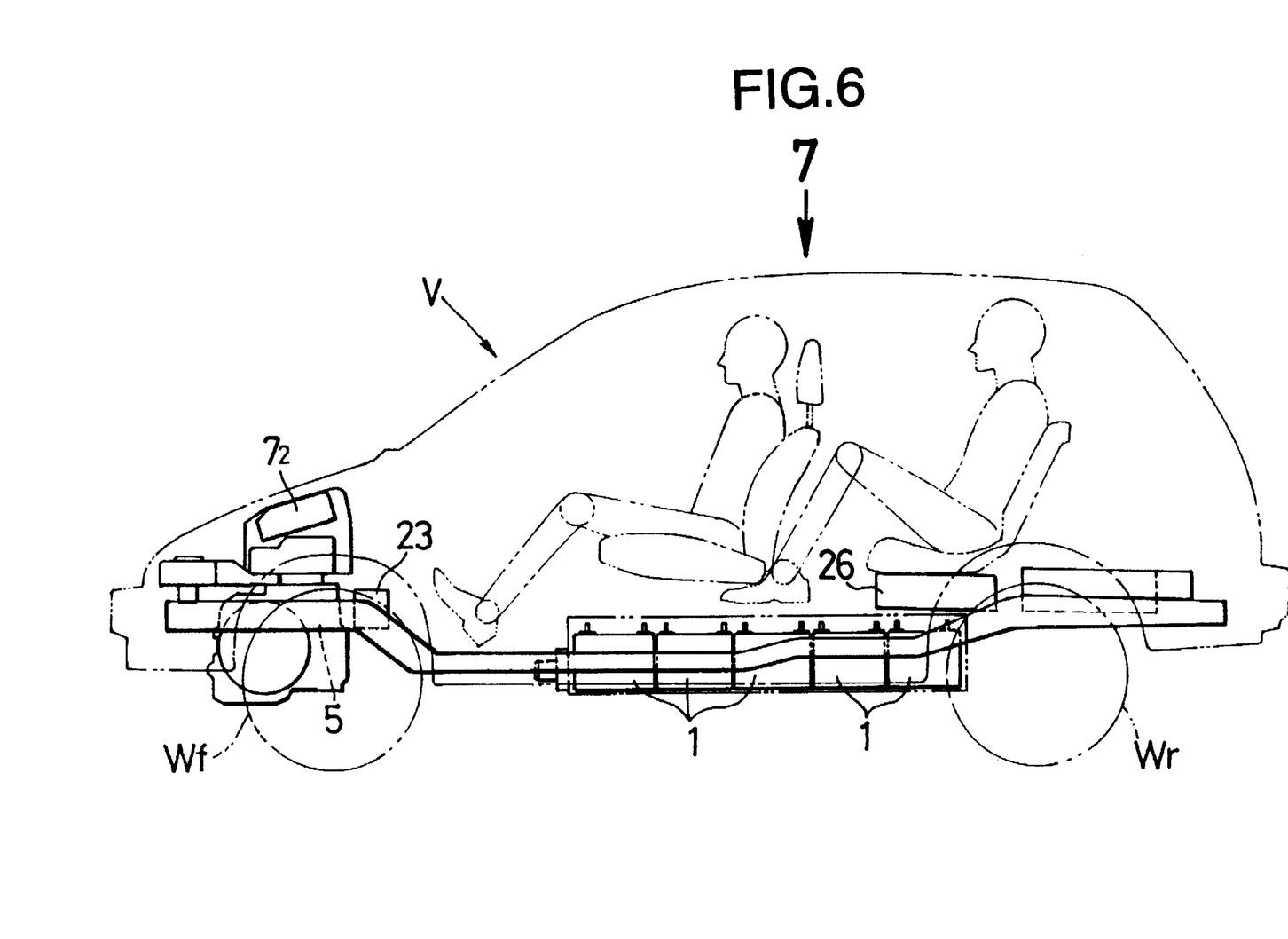
FIG. 6 is a side view of the entire electric vehicle to which a second embodiment of the present invention is applied.
Figure 7:
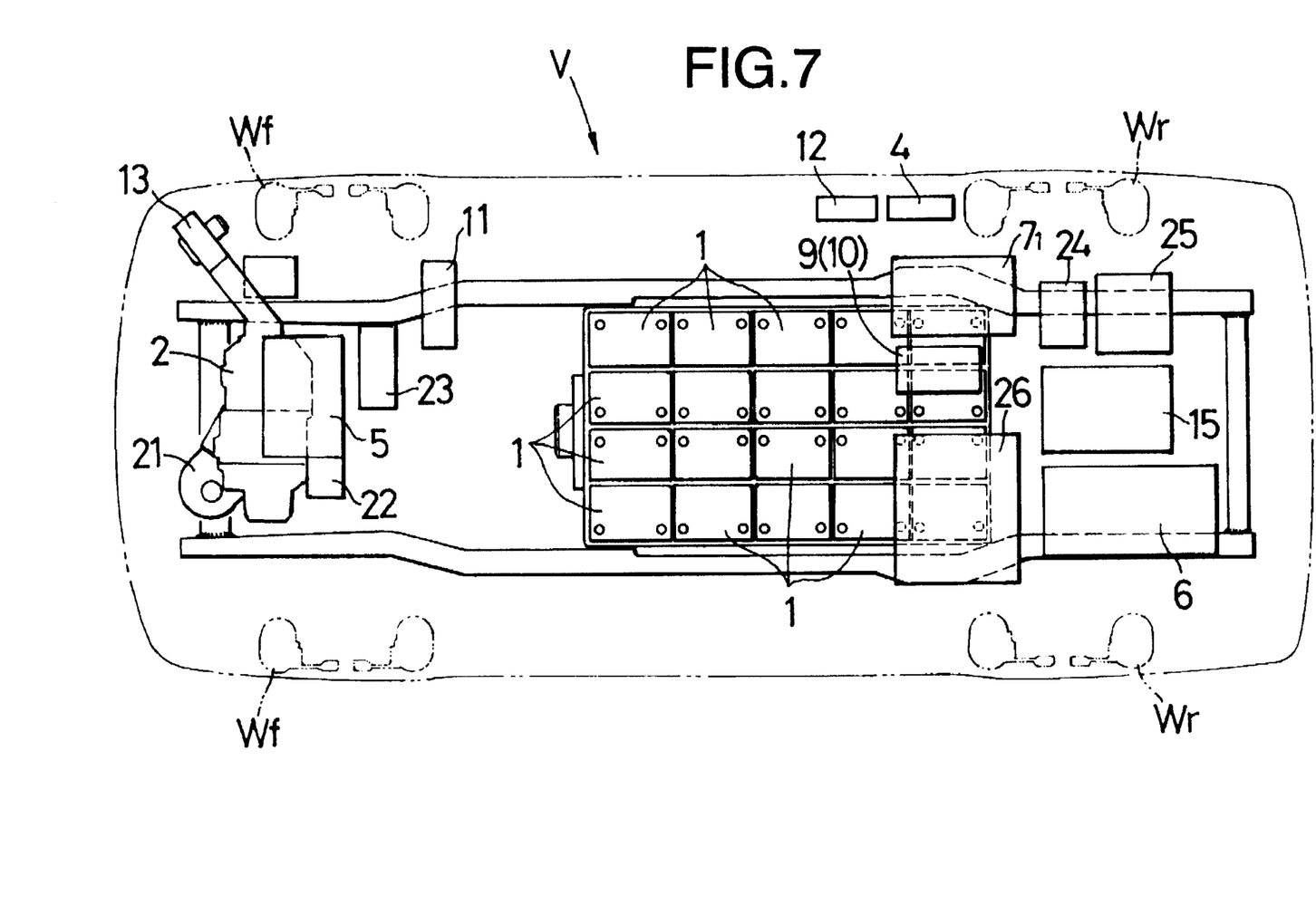
FIG. 7 is a top view taken in the direction of arrow 7 in FIG. 6.
Figure 8:
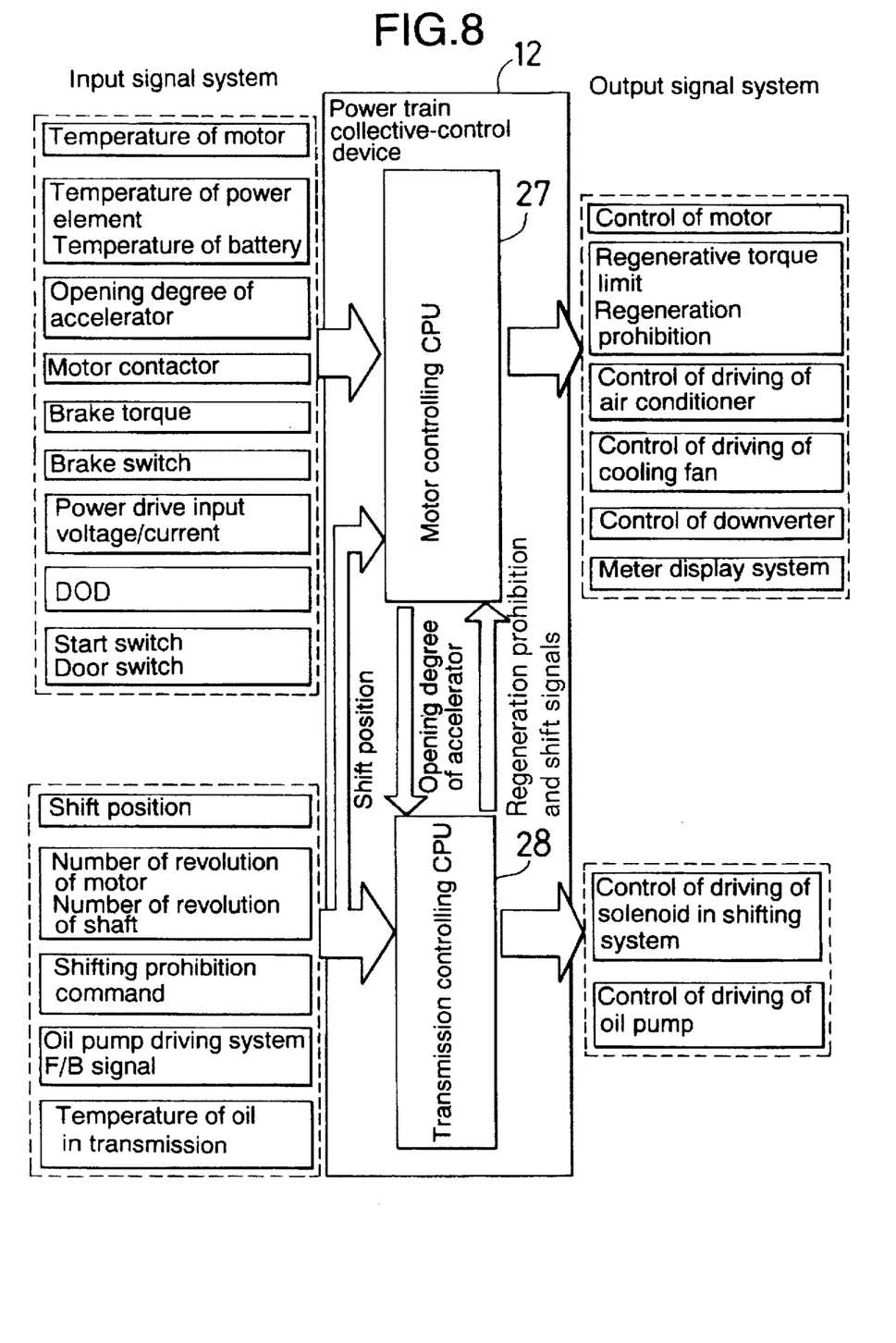
FIG. 8 is a diagram for explaining the function of a power train collective-control device.

A second embodiment of the present invention is illustrated in FIGS. 6 to 8.

As shown in FIGS. 6 and 7, in an electric vehicle V to which the second embodiment is applied, the front wheels Wf are driven by the motor 2. A motor cooling fan 13, a power driver unit cooling fan 21, a compressor 22 for an air conditioner and a combustion heater 23 for heating are mounted in the vicinity of the motor 2. Mounted at a rear portion of the vehicle are an assist motor driver 24 for an oil pump assist motor 16 for driving an oil pump, an inverter 25 for the motor 2, and a fuel tank 26 for the combustion heater 23.

Four control devices are disposed in the following manner. The power driver control device 4 is disposed on the right side of the vehicle body; the management control device 10 is disposed in a breaker box 9 at the central portion of the vehicle body; the brake control device 11 is disposed on the right side of the vehicle body; and the power train collective-control device 12 is disposed on the right side of the vehicle body.

As shown in FIG. 8, the power train collective-control device 12 includes a motor-controlling CPU 27 and a transmission controlling CPU 28.

A signal indicative of the temperature of the motor, a signal indicative of the temperature of the power element, a signal indicative of the temperature of the battery, a signal indicative of the opening degree of an accelerator, a signal indicative of ON/OFF of the motor contactor, a signal indicative of a brake torque, signals indicative of the input voltage and current, a signal indicative of DOD (depth of discharge of the battery), a start switch signal, a door switch signal, and a shift position signal are supplied to the motor controlling CPU 27. The shift position signal, a signal indicative of the number of revolutions of the motor, a signal indicative of the number of revolutions of the shaft, a signal indicative of a command to prohibit shifting, a signal indicative of a feedback in the oil pump driving system and a signal indicative of the temperature of the oil in the transmission are supplied to the transmission controlling CPU 28.

A motor controlling signal, a regenerative torque limit signal/regenerative prohibition signal, a cooling fan driving signal, a downverter controlling signal and a meter display system driving signal are delivered from the motor controlling CPU 27 to the power driver control device 4, the management control device 10 and the brake control device 11. A signal indicative of a command to drive a solenoid in the shifting system and an oil pump driving signal are delivered from the transmission controlling CPU 28.

In addition, the signal indicative of the openings degree of the accelerator is supplied from the motor controlling CPU 27 to the transmission controlling CPU 28, and a regeneration prohibition command signal and a shifting command signal are supplied from the transmission controlling CPU 28 to the motor controlling CPU 27.

In addition to the operational effect of the first embodiment, according to the second embodiment, it is possible to provide a further enhancement in processing speed, because the power train collective-control device 12 includes the two CPUs: the motor controlling CPU 27 and the transmission controlling CPU 28.

What is claimed is:

1. A control system in an electric vehicle having a battery, a motor driven by said battery to cause travel of the vehicle, and a brake device for braking the vehicle, said control system comprising:

a power driver control device for controlling a driving system including the motor;

a management control device for controlling a power distributing system including the battery; and a brake control device for controlling a braking system including the brake device, said power driver control device, said management control device and said brake control device each being located in a physically location in the electric vehicle substantially spaced from each of the other said devices and collectively controlled and monitored by a separate power train collective-control device.

2. A control system in an electric vehicle according to claim 1, wherein said power driver control device, said management control device and said brake control device are mutually monitored by said power train collective-control device for detecting a trouble in any of the three said control devices through communication with said power train collective-control device.

3. A control system in an electric vehicle according to claim 1, wherein said power driver control device, said management control device and said brake control device also are in a physically spaced and distributed manner in the electrical vehicle from said power train collective-control device.

4. A control system in an electric vehicle according to claim 1, wherein said power driver control device, said management control device, said brake control device and said power train collective-control device each have a separate central processing unit.

5. A control system in an electric vehicle according to claim 1, wherein said power driver control device, said management control device and said brake control device each separately control various constituents of the operations of said driving system, power distributing system and braking system, respectively.

6. A control system in an electric vehicle having a battery, a motor driven by said battery to cause travel of the vehicle, and a brake device for braking the vehicle, said control system comprising:

a power driver control device mounted on one side of the electric vehicle for controlling a driving system including the motor;

a management control device mounted in a central location on the electric vehicle for controlling a power distributing system including the battery; and a brake control device mounted in a front portion of the electric vehicle for controlling a braking system including the brake device, said power driver control device, said management control device and said brake control device being mounted in substantially spaced locations in the electric vehicle and collectively controlled and monitored by a power train collective-control device.

7. A control system in an electric vehicle according to claim 6, wherein said power driver control device, said management control device and said brake control device are mutually monitored by said power train collective-control device for detecting a trouble in any of the three said control devices through communication with said power train collective-control device.

8. A control system in an electric vehicle according to claim 6, wherein said power train collective-control device is mounted on a side of the electric vehicle opposite said one side, and said power driven control device, said management control device and said brake control device also are substantially spaced in the electrical vehicle from said power train collective-control device.

9. A control system in an electric vehicle according to claim 6, wherein said power driver control device, said management control device, said brake control device and said power train collective-control device each have a separate central processing unit.

10. A control system in an electric vehicle according to claim 6, wherein said power driver control device, said management control device and said brake control device each separately control various constituents of the operations of said driving system, power distributing system and braking system, respectively.

11. A control system in an electric vehicle having a battery, and a motor driven by said battery to cause travel of the vehicle, said control system comprising;

a power driver control device for controlling a driving system including a power driver unit and the motor;

a management control device for controlling a power distributing system including a downverter and the battery;

a power train collective-control device for collectively controlling and monitoring said power driver control device and said management control device;

said power driver control device, said power driver unit, said management control device, said downverter and said power train collective-control device each being a physically separate component of the control system and mounted on the electric vehicle at separate locations;

said power driver unit being mounted between said power driver control device and said management control device; and said downverter being mounted between said power train collective-control device and said management control device.

12. A control system in an electric vehicle according to claim 11, wherein said management control device is mounted in a central portion of the electric vehicle, said power driver control device is mounted on one side of the electric vehicle, and said power train collective-control device is located on an opposite side of the electric vehicle.

13. A control system in an electric vehicle according to claim 11, wherein the control system includes a brake control system having a brake control device mounted at a front of the electric vehicle substantially spaced from all of said separate components.

* * * * *